United States Patent
Brown et al.

(10) Patent No.: US 9,169,362 B2
(45) Date of Patent: Oct. 27, 2015

(54) METHOD AND SYSTEM FOR TREATING ELASTOMERS AND ARTICLES MADE THEREFROM

(75) Inventors: Gary Brown, Chatham (CA); Clifford C. Fay, Kingston, PA (US)

(73) Assignee: Prime Elastomers, LLC, Dunmore, PA (US)

( * ) Notice: Subject to any disclaimer, the term of this patent is extended or adjusted under 35 U.S.C. 154(b) by 1035 days.

(21) Appl. No.: 13/100,912

(22) Filed: May 4, 2011

(65) Prior Publication Data

US 2012/0059084 A1    Mar. 8, 2012

Related U.S. Application Data

(60) Provisional application No. 61/331,105, filed on May 4, 2010.

(51) Int. Cl.
| | |
|---|---|
| *C08J 3/22* | (2006.01) |
| *B29B 17/00* | (2006.01) |
| *C08J 3/20* | (2006.01) |
| *C08K 5/09* | (2006.01) |
| *C08L 19/00* | (2006.01) |
| *B29K 21/00* | (2006.01) |
| *C08K 3/00* | (2006.01) |
| *C08K 5/548* | (2006.01) |
| *C08L 23/06* | (2006.01) |

(52) U.S. Cl.
CPC ............ *C08J 3/226* (2013.01); *B29B 17/0026* (2013.01); *C08J 3/203* (2013.01); *C08K 5/09* (2013.01); *C08L 19/003* (2013.01); *B29K 2021/00* (2013.01); *C08J 2321/00* (2013.01); *C08J 2421/00* (2013.01); *C08K 3/0033* (2013.01); *C08K 5/548* (2013.01); *C08L 23/06* (2013.01); *Y02W 30/62* (2015.05)

(58) Field of Classification Search
CPC ........ C08J 3/203; C08J 3/226; C08J 2321/00; C08J 2421/00; C08K 5/09; C08K 5/548; C08K 3/0033; C08L 19/003; C08L 23/06; B29B 17/0026; Y02W 30/62; B29K 2021/00
USPC ........................................................ 525/185
See application file for complete search history.

(56) References Cited

U.S. PATENT DOCUMENTS

| | | |
|---|---|---|
| 3,873,482 A | 3/1975 | Severson et al. |
| 4,018,730 A | 4/1977 | McDonald |
| 4,065,426 A | 12/1977 | Yamawaki et al. |
| 4,244,841 A | 1/1981 | Frankland |
| 4,481,335 A | 11/1984 | Stark, Jr. |
| 4,579,871 A | 4/1986 | Lindén et al. |
| 4,792,589 A | 12/1988 | Colvin et al. |
| 4,895,911 A | 1/1990 | Mowdood et al. |
| 5,407,989 A | 4/1995 | Davis et al. |
| 5,488,080 A | 1/1996 | Osborn |
| 5,604,277 A | 2/1997 | Osborn |
| 6,133,360 A | 10/2000 | Barren et al. |
| 6,241,380 B1 | 6/2001 | Bornemann et al. |
| 6,310,126 B1 | 10/2001 | Osborn |
| 6,346,561 B1 | 2/2002 | Osborn |
| 6,527,430 B2 | 3/2003 | Osborn |
| 6,924,319 B1 | 8/2005 | Alsdorf et al. |
| 6,924,320 B2 | 8/2005 | Morriston |
| 6,943,220 B2 | 9/2005 | Matsunaga et al. |
| 7,087,665 B2 | 8/2006 | Sylvester et al. |
| 7,119,147 B2 * | 10/2006 | Kikuchi .................. 525/193 |
| 7,342,052 B2 | 3/2008 | Fulford et al. |
| 2001/0004649 A1 | 6/2001 | Osborn |
| 2003/0204002 A1 | 10/2003 | Osborn |
| 2004/0242711 A1 * | 12/2004 | Fulford et al. ............ 521/41 |
| 2005/0182193 A1 * | 8/2005 | Ajbani et al. ............. 525/88 |
| 2006/0086836 A1 | 4/2006 | Osborn |

FOREIGN PATENT DOCUMENTS

| | | |
|---|---|---|
| JP | 59 124829 A | 7/1984 |
| WO | WO 03/014207 A1 | 2/2003 |

OTHER PUBLICATIONS

Wang, W., et al.; Polymer Engineering & Science, 2003, p. 1-10.*
Shanmugharaj, A.M., et al.; Polymer Testing, 2005, p. 739-745.*

* cited by examiner

*Primary Examiner* — Robert Jones, Jr.
(74) *Attorney, Agent, or Firm* — Alan G. Towner, Esq.; Pietragallo Gordon Alfano Bosick & Raspanti, LLP

(57) ABSTRACT

A method and system for treating rubber-containing elastomers to produce materials suitable for blending with thermoplastic or thermoset polymers are disclosed. The elastomers may comprise virgin or recycled particulate rubber such as from used tires. The blended rubber and polymer materials possess thermoplastic properties and can be reused many times.

30 Claims, 1 Drawing Sheet

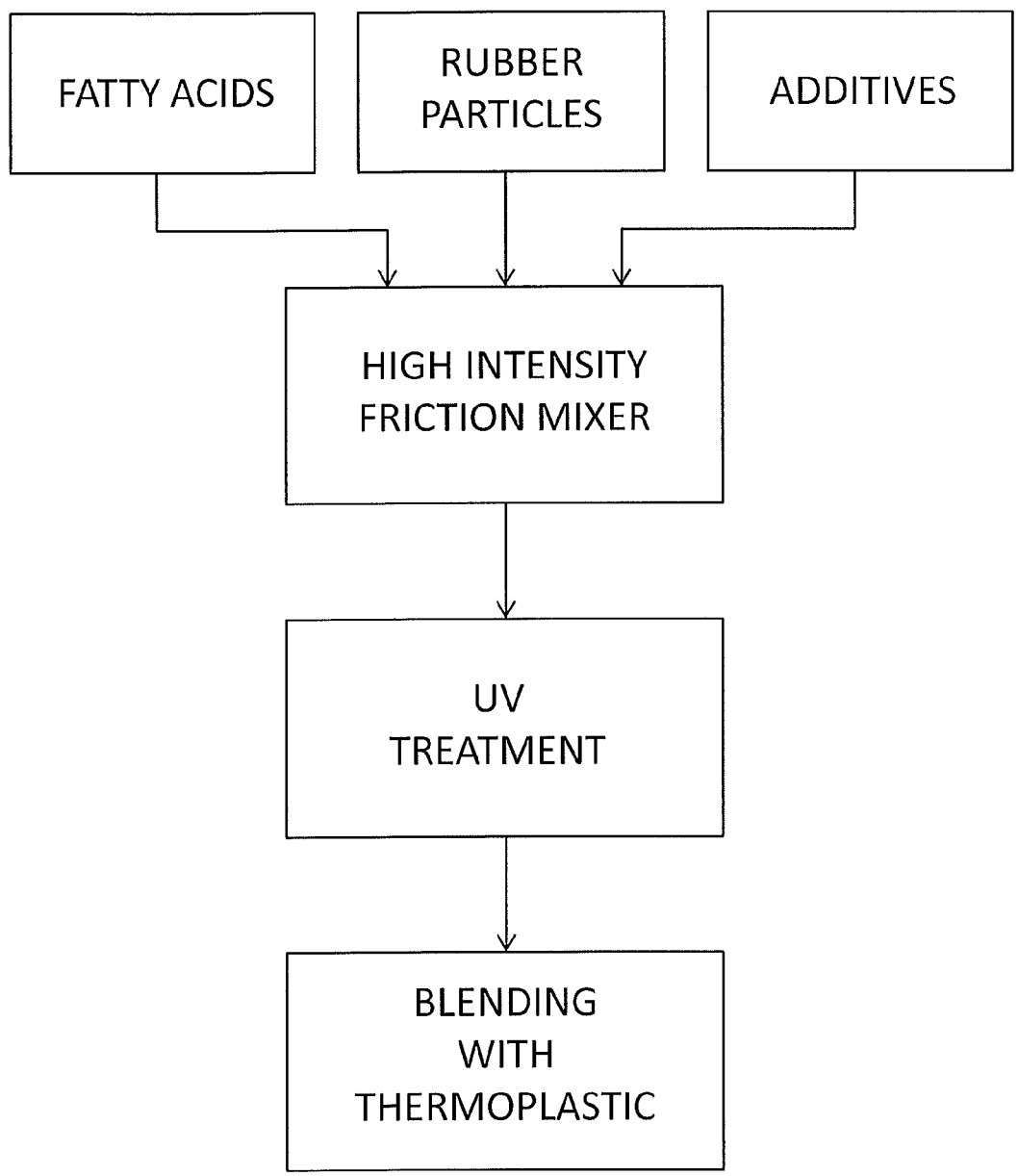

METHOD AND SYSTEM FOR TREATING ELASTOMERS AND ARTICLES MADE THEREFROM

CROSS-REFERENCE TO RELATED APPLICATION

This application claims the benefit of U.S. Provisional Patent Application Ser. No. 61/331,105 filed May 4, 2010, which is incorporated herein by reference.

FIELD OF THE INVENTION

The present invention relates to methods and systems for treating elastomers, and more particularly relates to the treatment of elastomers such as rubber to improve their ability to be blended with thermoplastic and thermoset polymers.

BACKGROUND INFORMATION

A variety of products can be made from thermoplastic and/or thermoset materials. Some thermoplastic and thermoset materials are relatively expensive or have limited performance characteristics or physical properties that are lacking. Some elastomers, such as virgin rubber or scrap rubber, may be less expensive or have desirable performance characteristics or desirable physical properties.

A typical passenger car tire is a complex manufactured article which typically comprises, as major constituents, synthetic rubber, natural rubber, carbon black, steel, as well as lesser quantities of fabrics, filler accelerators, antiozonants etc. These constituents are not uniformly distributed throughout the tire but occur in varying concentrations at differing locations in the tire. For example, the tread, base, sidewall and inner liner of the tire are comprised of varying proportions of natural rubber, styrene-butadiene rubber and isobutylene-isoprene rubber. Typical mechanical processes, such as used to reduce the tires to small fragmentary particles for further processing to enable reclamation of the chemical value of the tire include granulation, comminution, cutting, sonic impacting or cryogenic fragmentation. These processes may be nonselective and thus the rubber particles may originate from all regions of the tire and thus the rubber particles so obtained may be of varying composition. While the fabric and steel content may be separated using well-known techniques, it is difficult or impossible to economically separate the rubber constituents. Thus processes which seek to extract value from these rubber particles should have comprehensive utility and yield acceptable products irrespective of the source location of the rubber particles in the tire.

Various processes and systems for treating particulate rubber and/or for utilizing particulate rubber as an addition to thermoplastic or thermoset polymers have been proposed. For example, U.S. Pat. Nos. 5,488,080; 5,604,277; 6,310,126; 6,346,561; and 6,527,430 to Osborn, and U.S. Patent Publication Nos. 2001/0004649 and 2003/0204002 to Osborn disclose such processes and systems. Other disclosures include U.S. Pat. Nos. 3,873,482; 4,244,841; 4,481,335; 4,579,871; 4,792,589; 4,895,911; 6,924,319; 6,924,320; and 7,342,052. All of these patents and applications are incorporated herein by reference.

Despite numerous attempts to successfully treat particulate rubber and to mix such treated rubber with thermoplastic or thermoset polymers, a need still exists for a process and system for making improved materials.

SUMMARY OF THE INVENTION

The present invention provides a method and system for treating elastomers such as rubber to produce materials suitable for blending with thermoplastic or thermoset polymers. The resulting resin mixture has thermoplastic properties and can be ground and reused numerous times.

An aspect of the present invention is to provide a method of making blended elastomeric and plastic materials comprising mixing elastomeric particles comprising rubber and at least one fatty acid-containing material in a friction mixer to thereby generate sufficient heat to raise the temperature of the rubber-containing particulate mixture to a selected mixing temperature, blending the rubber-containing particulate mixture with at least one thermoplastic or thermoset polymer, and recovering a blended material comprising the rubber and the at least one thermoplastic or thermoset polymer.

Another aspect of the present invention is to provide a method of treating rubber-containing particles comprising mixing rubber particles and at least one fatty acid-containing material in a friction mixer to thereby generate sufficient heat to raise the temperature of the mixture to at least 200° F., wherein the temperature is raised without application of an external heat source to the rubber-containing particles or the fatty acid-containing material.

A further aspect of the present invention is to provide a method of treating rubber particles comprising mixing rubber-containing particles and at least one fatty acid-containing material in a friction mixer to thereby generate sufficient heat to raise the temperature of the mixture to a selected mixing temperature, and treating the particulate mixture with a source of ultraviolet radiation.

Other aspects of the present invention are to provide materials made by the methods described above.

These and other aspects of the present invention will be more apparent from the following description.

BRIEF DESCRIPTION OF THE DRAWINGS

FIG. 1 is a schematic flow diagram illustrating an elastomer treatment method and system in accordance with an embodiment of the present invention.

DETAILED DESCRIPTION

An embodiment of the present invention provides for treatment of rubber-containing elastomers such as virgin rubber or scrap rubber to improve their ability to be combined with thermoplastic and thermoset polymers. The resulting material may be a thermoplastic, with the ability to be processed, reground and processed again many times.

FIG. 1 schematically illustrates an elastomer treatment method in accordance with an embodiment of the present invention. Rubber particles, fatty acid-containing materials, and optional additives are introduced into a high intensity friction mixer. The rubber particles may comprise scrap rubber, e.g., from used tires, industrial rubber, or any other known source of rubber material. In one embodiment, recycled crumb rubber, such as SBR and EPDM, may be used.

The fatty acid-containing material may include oleic acid, linoleic acid and/or stearic acid, as well as other types of fatty acids. The fatty acids may be provided from various sources such as soya or soybean oil, peanut oil, tall oil and derivatives thereof, and the like. For example, the fatty acid-containing material may be a mixture of fatty acids, e.g., oleic acid and linoleic acid. These fatty acids are available from soy bean oil processing and other sources. In one embodiment, from about 1 to about 10 weight percent of the fatty acid-containing material may be added to the rubber particles. In a particular embodiment, a 3 weight percent level may be used. The fatty acid may be added before or during the mixing process. In one embodiment, the fatty acid-containing material is added immediately before mixing. In another embodiment, the rubber particles are frictionally heated in the mixer, followed by addition of the fatty acid-containing material to the heated particles. Typical mixing times range from about 2 to about 15 minutes, for example, from about 4 to about 12 minutes.

Optional additives may include polyethylene such as linear low density polyethylene (LLDPE), thermoplastic elastomers, talc, carbon black, carbon fibers, metal fibers, calcium carbonate, Wollastonite, fiberglass, pigments, and the like in a total amount of up to 50 weight percent or more of the mixture. For example, at least one of the following additives may be used: 4 to 19 weight percent Wollastonite ($CaSiO_3$ with small amounts of Fe, Mg and Mn substituting for the Ca); 4 to 10 weight percent micro talc; 1 to 2 weight percent Ceramer (polyphenylene sulfone-based polymer); 0.5 to 2 weight percent Struktol (dispersing agents comprising a blend of fatty acid metal soap and amide); 0.5 to 1.5 weight percent Aktiplast F cross-linker; 10 to 40 weight percent ethylene propylene diend monomer (EPDM); and 5 to 10 weight percent calcium carbonate.

In one embodiment of the invention, at the same time LLDPE and talc additives are added, up to 20 weight percent of conductive carbon black may be added. This, combined with the existing carbon black in the crumb rubber, when mixed with polyethylene or polypropylene makes the resulting material either conductive or anti static depending on the level of carbon black. The resulting material is much less expensive than competitive conductive plastics. In yet another embodiment, silane coated talc or micro talc may be added to the mixture in a typical amount ranging from 1 to 20 weight percent, for example, from 5 to 15 weight percent, or from 7 to 12 weight percent, of the mixture. In a particular embodiment, such talc additive may be about 10 weight percent of the mixture.

In addition to the above-noted additives, it may be desirable to add small quantities of additional chemical agents which act as surfactants, viscosity modifiers and/or bonding agents to promote chemical interaction between the rubber-fatty acid product and the polymer medium. In one embodiment, thermoplastic elastomers with a styrene block, polyethylene or polypropylene chain may be added after the initial mixing of the rubber particles and the fatty acids.

As shown in FIG. 1 and more fully described below, a high intensity friction mixer is used to generate a vortex flow pattern of the particulate material or a fluidized bed during the mixing process. Friction generated from the rigorous mixing produces sufficient heat during the process without the necessity of a separate heat source. For example, the friction generated by mixing produces a minimum mixing temperature of about 200° F. up to 250° F. or higher.

The friction mixer may include at least one rotatable impeller inside a containment drum. Examples of suitable high intensity friction mixers for use in the present invention include model number FM 500 D KM 1750 B commercially available from Henschel Company, model number 250 JSS commercially available from Henschel Company, and the like. The mixing action of the high intensity friction mixer permits an individualization of rubber particles that not only results in rapid, precise mixing, but exposes tremendous particle surface area for exceptionally fast dispersion and heat transfer. This mixing action may be accomplished by impellers rotating at relatively high tip speeds to create an intense vortex mix action that keeps the materials of the mix in a rotating horizontal movement coupled with a cascading vertical movement. With these concurrent actions and the intense swirling vortex, the materials of the mix are lifted up and along the periphery of the drum, then deflected down through the vortex and into the impeller system again. The two streams of rubber, one flowing up and one flowing down, at their interface rub against each other to create the heat required to maximize the rubber particles surface area for acceptance of the additives. This mix action can be characterized as a pulsating mechanically fluidized bed.

The timing of the integration of the additives and the time that they are allowed to disperse in the HIFM are controlled such that one additive does not impede the function of each individual additive and to allow for proper dispersion. In one embodiment, the fatty acid-containing material may be added after the rubber has reached and maintains a minimum of about 200° F., but not greater than 275° F. In one embodiment, the mixing of the rubber and fatty acid is continued for about 8 minutes, and linear low density polyethylene (LLDPE) may be added after the initial 8 minutes of mixing of the fatty acid for a period of 4 minutes. Additional talc such as micro talc, silane coated talc, etc. can be incorporated at the same time for the same 4 minute period.

The mixing action and the resultant self-heating of the rubber particles, the timing of the additive incorporation into the HIFM, and the duration of the mixing may be controlled to produce a dust inhibited and substantially residue free rubber compound. The resulting rubber particles can be tailored for subsequent blending with thermoplastic or thermoset polymers.

After the mixing process, the resultant mixture may be cooled inside the HIFM or after it is discharged therefrom, e.g., onto a tray or belt conveyor. The mixture may optionally be exposed to ultra-violet radiation to reduce odor or for other purposes. Typical UV exposure times range from 1 second to 5 minutes, for example, from 30 seconds to 2 minutes. Suitable sources of UV radiation include UV lamps and the like.

As shown in FIG. 1, the rubber/fatty acid mixture may then be blended with a polymeric material, such as thermoplastic and/or thermoset polymers. For example, from about 5 to about 75 weight percent of the mixture may be blended with from about 25 to about 95 weight percent polyethylene or polypropylene, as more fully described below.

Commercial polypropylene and polyethylene typically have the following physical properties: melt flow (how easy it pushes into a mold or through a die) 0.5-30; Izod impact (how resistant a material is to being hit before it breaks) from 0.5 to "no break"; tensile strength (how resistant the molded or extruded part is to being pulled apart) 5,000-10,000 psi; modulus (how stiff the molded or extruded product is) 50,000-1,000,000; and elongation (how far will it stretch before breaking) 30-300%.

In the past, when recycled crumb rubber was added to polypropylene or polyethylene, it was added as a simple filler. The physical properties of the base polymer started to degrade immediately. For example, the amount that could be used as an additive was typically 5 weight percent or less. In accordance with embodiments of the present invention, the physical properties of the base resin may be improved. For example, a conventional polypropylene blend may have an Izod of 1.3, while a blend produced in accordance with the present invention may have an Izod of 1.8, 2.0, 2.8 or even higher.

By tailoring the amount and the physical properties of the base resin, it is possible to match almost any physical olefin property commercially desired. The resulting molded or extruded product can be ground up and remolded or extruded into other finished products.

The friction mixing process dramatically increases the surface area of the individual particles. The process may work at lower temps because the rubber particles may fracture as well as have their surface area increased. It has also been found that the friction mixing process may increase the volume of the starting rubber particles. For example, the volume of the mixed rubber particles and fatty acid may be at least 5 or 10 percent greater when discharged from the friction mixer in comparison with the volume of the starting rubber particles.

The high intensity friction mixer may have typical batch sizes from 50 to 1,500 liters. The configuration of the impeller(s) and the use of knives, deflectors and/or other structures within the mixer, as well as spacing tolerances, may be routinely selected in order to maximize the mixing characteristics, e.g., for better dispersion of the fatty acids and additives, which ultimately enhances the surface area and physical properties of the mixed products. Another result of the frictional mixing is the heat produced which further aids in incorporation and dispersion of the additives.

In accordance with an embodiment of the invention, once the HIFM reaches an initial temperature of about 200° F., a 2 to 5 weight percent mixture of fatty acid-containing material composed of mostly oleic and/or linoleic acids is added and the resulting mixture is processed for about 8 to 10 minutes at a constant heat, e.g., from about 200 to about 275° F. At that point, 2 to 10 weight percent of LLDPE may be added and processed for at least 4 additional minutes, or until the additive has been fully dispersed and completely coats the rubber particles. At that point, 1 to 40 weight percent of sub micron sized silane-treated talc may be added and the resulting mixture may be processed for about 4 minutes or until the rubber particles are completely coated with the additive. The mixture may then be auger unloaded and pneumatically transported until ambient temperatures are achieved for packaging and storage purposes. This process may take about 2 to 5 minutes during which time a new batch treatment may be started.

The mixing step may be conducted in a variety of atmospheres including, but not limited to, air, carbon dioxide, etc.

At the conclusion of the agitation the rubber particle-tall oil product is allowed to cool to room temperature. In one embodiment the mixture may be deposited on a conveyor belt and allowed to cool.

The cooling process can optionally use waste nitrogen of $CO_2$ gas from a cryogenic crumb rubber processing line, e.g., at a tire processing plant. During the cooling cycle the processes rubber may run through a high output UV light to completely crosslink any resulting monomer or volatiles, thus improving surface bonding and reducing odors.

In accordance with an embodiment of the invention, immediately after the processing is complete, 1 to 5 weight percent (depending on the final properties required) of granular LLDPE and 2 to 10 weight percent of reactive surface treated sub micron particle sized talc may be added. The additives allow the processed rubber to more easily be integrated into either polypropylene or polyethylene. The specific addition of these two materials also helps to tailor the required final physical properties, e.g., impact, modulus, tensile strength, etc. that are necessary to the end user. The material mixture is then processed for approximately 5 more minutes. These additives also have the additional benefit of making the processed rubber able to be handled in a commercial environment. Conventional crumb rubber tends to be extremely fine and dusty, making the material extremely difficult to handle.

The cooled mixture is an excellent feedstock for multiple applications. For example, the mixture may be blended with a thermoplastic and processed to develop either a finished product or a blended and commingled mixture of the rubber-fatty acid product and the thermoplastic in a form, like pellets, suitable for further blending and processing. Additional examples include blending with paint to create a finish with integral non-slip or enhanced grip features.

Materials made in accordance with the present invention may be subjected to a number of mechanical tests including: flexural modulus, e.g., using the standard procedure described in ASTM D790; high speed puncture multiaxial impact response at both 20° C. and −15° C., e.g., using the standard procedure described in ASTM D3763; and notched Izod impact response, e.g., using the standard procedure described in ASTM D256.

The following examples are intended to illustrate various aspects of the present invention, and are not intended to limit the scope of the invention.

Example 1

1,200 pounds of particulate rubber from used tires (SBR) or industrial rubber having a particle size of minus 40 mesh are placed in a commercially available Henschel HIFM having a capacity of 1,500 liters. The HIFM is operated at an impeller rotational speed of from 1,485 to 2,970 rpm, which results in a vortex flow pattern of the rubber particles and frictional heating of the particles with no externally applied heat source. After about 11 minutes, the frictionally heated mixture reaches a temperature of 200° F. Mixing is continued while adding 39 pounds of tall oil. After 10 minutes of mixing the rubber particles and tall oil, 26 pounds of silane coated talc or micro talc and 26 pounds of LLDPE are added to the HIFM, and the mixing is continued for another 4 minutes. The resulting mixture is removed from the HIFM, cooled and subjected to UV treatment by exposing the mixture to an 800 watt per inch UV lamp for 1 to 3 seconds. 25 pounds of the resulting mixture are blended with 75 pounds of polypropylene (o-polyethylene) having a particle size of minus ⅛ inch mesh sold by the Ineos Company under the designation MLX1044. Blending of the rubber mixture and polypropylene is done in a standard mechanical mixer for 2 minutes. The blended rubber/polypropylene mixture is then injection molded to form a sheet or cover product comprising a composite containing the rubber and polypropylene components. Physical properties of the rubber/polypropylene composite materials are tested by standard ASTM and ISO techniques, and the measured properties are 1.8 Izod; 100,000 flex modulus; and 8.0 melt index.

Example 2

1,200 pounds of particulate rubber from used tires (SBR) or industrial rubber having a particle size of minus 40 mesh are placed in a commercially available Henschel HIFM having a capacity of 1,500 liters. The HIFM is operated at an impeller rotational speed of from 1,485 to 2,970 rpm, which results in a vortex flow pattern of the rubber particles and frictional heating of the particles with no externally applied heat source. After about 11 minutes, the frictionally heated mixture reaches a temperature of 200° F. Mixing is continued while adding 39 pounds of fatty acid concentrate derived from soya oil. After 10 minutes of mixing the rubber particles and concentrate, 39 pounds of silane coated Wollastonite, 24 pounds of Struktol dispersing agents comprising 75 percent Struktol 28 and 25 percent Struktol 016, 12 pounds of Aktiplast F cross-linker and 24 pounds of LLDPE are added to the HIFM, and the mixing is continued for another 4 minutes. The resulting mixture is removed from the HIFM, cooled and subjected to UV treatment by exposing the mixture to an 800 watt per inch UV lamp for 1 to 3 seconds. 25 pounds of the resulting mixture are blended with 75 pounds of recycled or virgin co-polymer polypropylene having a particle size of minus 3/8 inch mesh. Blending of the rubber mixture and polypropylene is done in a standard single or twin screw mechanical mixer for 2 minutes. The blended rubber/co-polymer polypropylene mixture is then injection molded to form a sheet or cover product comprising a composite containing a homogenous blend of the rubber and co-polymer components. Physical properties of the rubber/co-polymer composite materials are tested by standard ASTM and ISO techniques with mechanical properties exceeding Izods of 1.5, tensiles exceeding 1,200 p.s.i., melt flows performing at g/10 min. of 12-15, and elongations exceeding 75 percent.

Example 3

1,200 pounds of particulate rubber from used tires (SBR) or industrial rubber having a particle size of minus 40 mesh (400 microns) are placed in a commercially available Henschel HIFM having a capacity of 1,500 liters. The HIFM is operated at an impeller rotational speed of from 1,485 to 2,970 rpm, which results in a vortex flow pattern of the rubber particles and frictional heating of the particles with no externally applied heat source. After about 11 minutes, the frictionally heated mixture reaches a temperature of 200° F. Mixing is continued while adding 39 pounds of fatty acid concentrate derived from soya oil. After 10 minutes of mixing the rubber particles and concentrate, 39 pounds of silane coated Wollastonite, 24 pounds of Struktol dispersing agents comprising 75 percent Struktol 28 and 25 percent Struktol 016, 12 pounds of Aktiplast F cross-linker and 24 pounds of LLDPE are added to the HIFM, and the mixing is continued for another 4 minutes. The resulting mixture is removed from the HIFM, cooled and subjected to UV treatment by exposing the mixture to an 800 watt per inch UV lamp for 1 to 3 seconds. 25 pounds of the resulting mixture are blended with 50 pounds of recycled co-polymer polypropylene having a particle size of minus 3/8 inch mesh and 25 pounds of uncured EPDM having a particle size of minus 20. Blending of the rubber mixture and co-polymer is done in a standard single or twin screw mechanical mixer for 2 minutes. The blended rubber/co-polymer polypropylene mixture is then injection molded to form a sheet or cover product comprising a composite containing a homogenous blend of the rubber and co-polymer components. Physical properties of the rubber/co-polymer composite materials are tested by standard ASTM and ISO techniques with mechanical properties exceeding Izods of 4.0, tensiles exceeding 1,200 p.s.i., melt flows performing (g/10 min.) at 30+, and elongations exceeding 125 percent.

Example 4

1,200 pounds of particulate rubber from used tires (SBR) or industrial rubber having a coarser particle size of 10-30 mesh are placed in a commercially available Henschel HIFM having a capacity of 1,500 liters. The HIFM is operated at an impeller rotational speed of from 1,485 to 2,970 rpm, which results in a vortex flow pattern of the rubber particles and frictional heating of the particles with no externally applied heat source. After about 5 minutes, the frictionally heated mixture reaches a temperature of 125° F. Mixing is continued while adding 39 pounds of fatty acid concentrate derived from soya oil, 39 pounds of silane coated Wollastonite, 24 pounds of Struktol dispersing agents comprising 75 percent Struktol 28 and 25 percent Struktol 016 and 12 pounds of Aktiplast F cross-linker are added to the HIFM, and the mixing is continued for another 4 minutes. The resulting mixture is removed from the HIFM, cooled and subjected to UV treatment by exposing the mixture to an 800 watt per inch UV lamp for 1 to 3 seconds. 80 pounds of the resulting mixture are blended with 20 pounds of recycled fractional melt recycled LLDPE having a particle size of minus 3/8 inch. Blending of the rubber mixture and LLDPE is done in a standard single or twin screw mechanical mixer for 2 minutes. The blended rubber/co-polymer polypropylene mixture is then injection molded to form a sheet or cover product comprising a composite containing a homogenous blend of the rubber and co-polymer components. The resulting blend is found to be homogenous and highly flexible.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method of making composite materials comprising:
    mixing elastomeric particles comprising rubber and at least one fatty acid-containing material in a friction mixer to thereby generate sufficient heat to raise the temperature of the rubber-containing particulate mixture to a selected mixing temperature to thereby produce rubber/fatty acid particles;
    cooling the rubber/fatty acid particles; and
    blending the rubber/fatty acid particles with particles of at least one thermoplastic or thermoset polymer to form a composite material comprising the rubber and polymer.

2. The method of claim 1, wherein the elastomeric particles comprise recycled rubber.

3. The method of claim 1, wherein the fatty acid-containing material comprises at least one of soya oil, peanut oil, tall oil and derivatives thereof.

4. The method of claim 1, wherein the fatty acid-containing material comprises soya oil or a derivative thereof, or peanut oil or a derivative thereof.

5. The method of claim 1, wherein the elastomeric particles and the fatty acid-containing material are mixed in a weight ratio of from about 90 to about 99 weight percent elastomeric particles and from about 1 to about 10 weight percent fatty acid-containing material.

6. The method of claim 1, wherein the polymer comprises a thermoplastic.

7. The method of claim 6, wherein the thermoplastic comprises polypropylene or polyethylene.

8. The method of claim 1, wherein the polymer comprises a thermoset polymer.

9. The method of claim 1, wherein the rubber/fatty acid particles comprise greater than about 10 weight percent of the composite material.

10. The method of claim 1, wherein the rubber/fatty acid particles comprise from about 5 to about 75 weight percent of the composite material.

11. The method of claim 1, wherein the friction mixer is not heated by an external heat source during the mixing step.

12. The method of claim 1, wherein the selected mixing temperature is at least about 200° F.

13. The method of claim 1, wherein the selected mixing temperature is from about 200° F. to about 250° F.

14. The method of claim 1, wherein the elastomeric particles and the fatty acid-containing material are introduced into the friction mixer at ambient temperature.

15. The method of claim 1, wherein the elastomeric particles and the fatty acid-containing material are not pre-heated prior to the mixing step.

16. The method of claim 1, wherein the rubber/fatty acid particles produced by the mixing step have a volume at least 5 percent greater than a volume of the elastomeric particles added to the friction mixer.

17. The method of claim 1, further comprising adding at least one additive to the elastomeric particles and fatty acid-containing material selected from Wollastonite, talc, ethylene propylene diend monomer, polyphenylene sulfone-based polymer, maleic anhydride, calcium carbonate, cross-linker and dispersing agent.

18. The method of claim 17, wherein the additive comprises Wollastonite in an amount of from about 4 to about 19 weight percent of the mixture.

19. The method of claim 17, wherein the additive comprises micro talc in an amount of from about 4 to about 10 weight percent of the mixture.

20. The method of claim 17, wherein the additive comprises ethylene propylene diend monomer in an amount of from about 10 to about 40 weight percent of the mixture.

21. The method of claim 17, wherein the additive comprises polyphenylene sulfone-based polymer in an amount of from about 1 to about 2 weight percent of the mixture.

22. The method of claim 17, wherein the additive comprises maleic anhydride in an amount of from about 1 to about 3 weight percent of the mixture.

23. The method of claim 17, wherein the additive comprises calcium carbonate in an amount of from about 5 to about 10 weight percent of the mixture.

24. The method of claim 17, wherein the additive comprises cross-linker in an amount of from about 0.5 to about 1.5 weight percent of the mixture.

25. The method of claim 17, wherein the additive comprises dispersing agent in an amount of from about 0.5 to about 2 weight percent of the mixture.

26. The method of claim 1, further comprising treating the rubber/fatty acid particles with a source of ultraviolet radiation.

27. The method of claim 26, wherein the ultraviolet treatment is performed prior to the blending of the rubber/fatty acid particles with the polymer particles.

28. The method of claim 26, wherein the rubber/fatty acid particles are exposed to the source of ultraviolet radiation for a period of from about 1 second to about 2 minutes.

29. The method of claim 26, wherein the source of ultraviolet radiation comprises a lamp.

30. A composite material produced by the method of claim 1.

* * * * *